US011995410B1

(12) United States Patent
Margolin

(10) Patent No.: US 11,995,410 B1
(45) Date of Patent: May 28, 2024

(54) HIERARCHICAL MODEL TO PROCESS CONVERSATIONS

(71) Applicant: Intuit Inc., Mountain View, CA (US)

(72) Inventor: Itay Margolin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/217,516

(22) Filed: Jun. 30, 2023

(51) Int. Cl.
*G06F 40/40* (2020.01)
*G06F 40/205* (2020.01)

(52) U.S. Cl.
CPC ............ *G06F 40/40* (2020.01); *G06F 40/205* (2020.01)

(58) Field of Classification Search
USPC .............................................. 704/7–10, 257
See application file for complete search history.

(56) References Cited

U.S. PATENT DOCUMENTS

| 9,812,151 | B1* | 11/2017 | Amini ................. G06T 13/40 |
| 2021/0358488 | A1* | 11/2021 | Iyer ..................... G10L 15/25 |
| 2022/0028371 | A1* | 1/2022 | Xu ...................... G10L 15/063 |
| 2023/0029759 | A1* | 2/2023 | Choi .................... G10L 15/16 |

OTHER PUBLICATIONS

Feng et al. Attention based hierarchical LSTM network for context-aware microblog sentiment classification; Jan. 29, 2018.*

* cited by examiner

*Primary Examiner* — Leonard Saint-Cyr
(74) *Attorney, Agent, or Firm* — Lathrop GPM LLP

(57) ABSTRACT

Systems and methods use hierarchical models to process conversations. A set of word vectors is processed using a sentence model, resulting in a sentence vector for the conversation message. The sentence vector is modified to include a time value. A set of sentence vectors, representing a time window, is processed using a window model, to generate a window vector for that time window. The window vector is updated to include a count value. A set of window vectors, corresponding to a set of time windows within the conversation, is processed using a conversation model to generate a conversation vector. A sentiment value indicating the sentiment of the conversation is presented, using a processor that generates the sentiment value from the conversation vector.

20 Claims, 6 Drawing Sheets

HIERARCHICAL MODEL TO PROCESS CONVERSATIONS

BACKGROUND

Businesses and other organizations that provide customer support or customer services should possess the capability to interact with a vast audience. For instance, a web services provider may interact with a large group of users to provide help with using the services provided. Increasingly, chatbots are used to provide customer support, which may augment the support provided by human staff. The use of language models to discern the intent of chatting parties has been a subject of continuous research. A challenge with chatbots is with analyzing conversations to develop a hierarchical understanding of conversations.

SUMMARY

In general, in one or more aspects, the disclosure relates to a method using hierarchical models to process conversations. A set of word vectors is processed using a sentence model, resulting in a sentence vector for the conversation message. The sentence vector is modified to include a time value. A set of sentence vectors, representing a time window, is processed using a window model, to generate a window vector for that time window. The window vector is updated to include a count value. A set of window vectors, corresponding to a set of time windows within the conversation, is processed using a conversation model to generate a conversation vector. A sentiment value indicating the sentiment of the conversation is presented, using a processor that generates the sentiment value from the conversation vector.

In general, in one or more aspects, the disclosure relates to a system including a conversation model that generates a conversation vector based on a conversation. The system further includes an application running on one or more processors use hierarchical models to process conversations. A set of word vectors is processed using a sentence model, resulting in a sentence vector for the conversation message. The sentence vector is modified to include a time value. A set of sentence vectors, representing a time window, is processed using a window model, to generate a window vector for that time window. The window vector is updated to include a count value. A set of window vectors, corresponding to a set of time windows within the conversation, is processed using a conversation model to generate a conversation vector. A sentiment value indicating the sentiment of the conversation is presented, using a processor that generates the sentiment value from the conversation vector.

In general, in one or more aspects, the disclosure relates to a method using hierarchical models to process conversations. A request corresponding to a conversation is transmitted. The conversation is processed by performing several steps. A set of word vectors is processed using a sentence model to generate a sentence vector for a message within the conversation. The sentence vector is modified to include a time value. A set of sentence vectors, representing a time window, is processed using a window model to generate a window vector. The window vector is updated to include a count value. A set of window vectors, representing a set of time windows that include the previous window, is processed using a conversation model to generate a conversation vector for the entire conversation. The method further includes receiving a response that contains a sentiment value generated from the conversation vector. The sentiment value is displayed to indicate the sentiment of the conversation.

Other aspects of the invention will be apparent from the following description and the appended claims.

DETAILED DESCRIPTION

In general, embodiments herein utilize one or more machine learning models to implement hierarchical models that process conversations. The conversations may be with a chatbot. A chatbot may be used to gather feedback on the experience of a user with a website or web service. Based on an understanding of the conversation between the chatbot and the user, the system may determine the sentiment of the conversation to identify whether the user was satisfied with the use of the web service and determine the likelihood of the user continuing to use the web service. Based on the sentiment, the system may adjust how it follows up with the user. For example, if the sentiment was below a satisfaction threshold, the system may provide a survey to request feedback to improve the services and site. Alternatively, if the sentiment meets the satisfaction threshold, the system may thank the user for using the system without requesting a survey to be filled out by the user.

A chatbot is a computer program designed to simulate conversation with human users. Chatbots use natural language processing and artificial intelligence to provide automated, intelligent conversations with users. Chatbots are used in a variety of applications, including applications that provide customer service, marketing, customer relationship management, and so forth.

In one embodiment, the sentiment is determined from a conversation vector. In one embodiment, the conversation vector represents a conversation between a user and a chatbot. The conversation vector is generated by converting the text to word vectors. The word vectors may be processed at a sentence level to generate sentence vectors and the sentence vectors may be modified to include time values to identify when the sentence, corresponding to the sentence vector, was uttered during the conversation. The sentence vectors may be grouped into windows to generate window vectors. The window vectors are updated to include counts of the number of sentence vectors that correspond to respective window vectors. The window vectors are then aggregated to form a conversation vector that is a hierarchical representation of the conversation.

Figure 1:
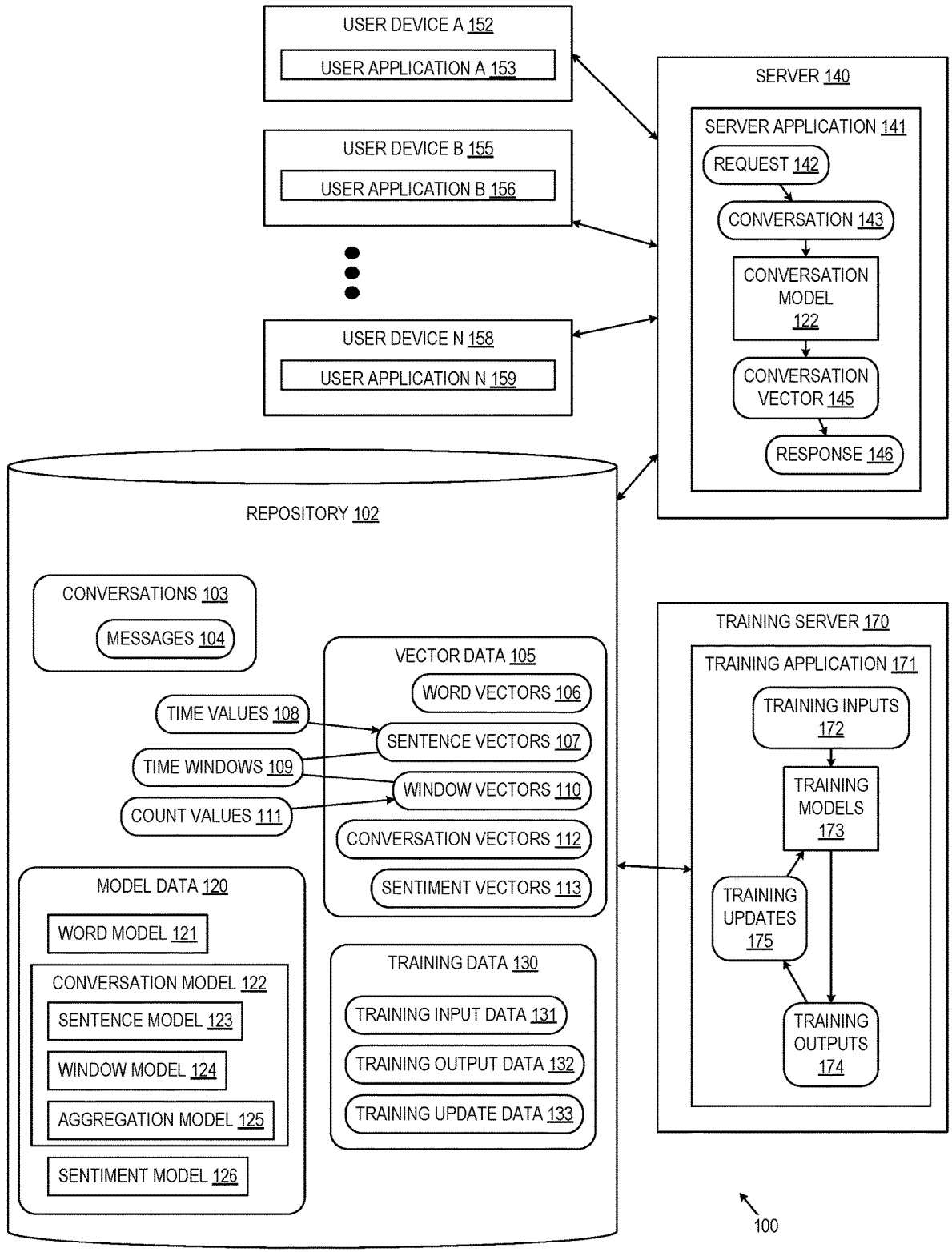
FIG. 1 is a diagram of an example computing environment, in accordance with at least one embodiment.

Turning to FIG. 1, the system (100) facilitates the use of hierarchical machine learning models to generate the conversation vector that represents a hierarchical understanding of a conversation. The conversation vectors (112) are generated by the conversation model (122). In one embodiment, the conversation model (122) uses multiple layers, which may also be referred to as models and which include the sentence model (123), the window model (124), and the aggregation model (125). The conversation model (122) operates as a part of the system (100).

Without limitation, the system (100) may include a repository (102), server (140), user devices A (152) and B (155) through N (158) with corresponding user applications A (153) and B (156) through N (159), and a training server (170). The repository (102), the server (140), and the training server (170) may be integrated to form a single server, connected via a network (not shown), or virtual servers that may run in a cloud computing environment. In one embodiment, the server (140) may receive input data (e.g., messages of a conversation between users and chatbots), utilize the machine learning models from the repository (102) to process the input data, and generate output data (e.g., conversation vectors) that may be further used as an input to another layer of a machine learning model.

In one embodiment, the repository (102) may store data to support operations of the server application (141), the training application (171). The repository (102) may store the conversations (103) that include messages (104). The repository (102) may also store the vector data (105) that may include word vectors (106), sentence vectors (107), time values (108), time windows (109), window vectors (110), count values (111), conversation vectors (112), and sentiment vectors (113). The repository (102) may store the model data (120) such as, without limitation, the word model (121), the sentence model (123), the window model (124), the conversation model (122), the aggregation model (125), and the sentiment model (126). The repository (102) may also store the training data (130) such as the training input data (131), the training output data (132), and the training update data (133). The training server (170) may include the training application (171) to update the training data (130).

The conversations (103) may store the messages (104) and associated metadata. The messages (104) may include words, sentences, phrases, or similar conversation data. For example, a chatbot implemented as part of the server application (141) exchanges messages with the user device A (152). The exchanged messages may be represented by word embeddings, sentence embeddings, etc., that stored as the messages (104) in the conversations (103). In this example, the messages may be associated with corresponding metadata such as, without limitation, a time period of the exchanging of messages, time steps between words or phrases, time steps of the gaps between sentences, identifiers of the user or process that created the message, etc.

The word vectors (106) may include the word embeddings from a particular conversation to be processed. In one embodiment, the word model (121) uses an algorithm (e.g., the word2vec algorithm, a neural network algorithm, etc.) to learn word associations from a large corpus of text. The corpus may include the conversations processed by the system and may include additional data. Once trained, the word model (121) may generate a representation of a distinct word or group of words in vector form, e.g., the word vectors (106). In one embodiment, the word vectors (106) capture semantic meaning and syntactic qualities of the words. The word vectors (106) with similar values and having shorter distances to each other (which may be measured by cosine similarity) have similar semantic meaning or other similar properties.

The sentence vectors (107) are vectors that represent sentences from the conversations (103), In one embodiment, one of the sentence vectors (107) may represent one of the messages (104). The sentence vectors (107) may include the sentence embeddings from the particular conversation to be processed. The sentence vectors (107) may be generated by the sentence model (123) from the word vectors (106). In one embodiment, the sentence model (123) may include a pretrained bidirectional encoder representations from transformers (BERT) model and may use a neural network algorithm to learn sentence associations from the word vectors to be processed. Once trained, the sentence model (123) may detect synonymous sentences and generate a representation of a distinct sentence in vector form. The sentence vectors (107) may capture the semantic meaning and syntactic qualities of the sentences. The sentence vectors (107) having similar values and shorter distances to each other (which may be measured by cosine similarity) have similar semantic meaning or other similar properties.

The time values (108) are values that identify times related to the sentence vectors (107). In one embodiment, one of the time values (108) identifies one or more of a start time or an end time for one of the sentence vectors (107) and corresponding one of the messages (104). The time values (108) may include an example feature that may be associated with an input of another model such as the window model (124) in the model data (120). In one embodiment, the time values (108) may be relative to the start time of respective conversations. For example, a first time value may be "0.0" representing the first message or sentence in a conversation and a second time value may be "9.9" representing the second message or sentence in the conversation, which started "9.9" seconds into the conversation.

In one embodiment, the time value may include an average time period of the sentence vectors (107) in a particular time window. The average time period may be utilized as the time value for all sentence vectors in the particular time window. For example, a particular time window includes a first sentence vector and a second sentence vector with a time period of 10 seconds and 20 seconds, respectively. In this example, the average value of 15 seconds (10 plus 20 divided by 2) may be used as the time value that may be concatenated or associated with the first sentence vector and the second sentence vector.

In one embodiment, a conversation is subdivided into multiple parts each represented by one of the time windows (109). Conversation during a first one of the time windows (109) may include an exchange of personal information while conversation during a second one of the time windows (109) may include the topic of the conversation. Each of the sentences for each of the windows may include unique time values.

The time windows (109) may define groupings of the messages (104) to be evaluated by the language models stored with the model data (120). The time windows (109) may be the length of time during which the words, sentences, etc., were uttered and recorded as the messages (104). For a conversation subdivided into time windows, a time window may define a time length of a portion of the conversation that is to be processed by a language model. Each time window may include a generated window vector and each window vector may be processed from one or more sentence vectors. Each time window may be associated with the one or more sentence vectors that were used to generate the corresponding window vector.

In one embodiment, the conversation (143) is to be evaluated by the conversation model (122) using equal time periods for the time windows (109) that correspond to the conversation (143). For example, the conversation (143) may be a 10-minute conversation subdivided into five groups such that each corresponding time window includes a time period of 2 minutes (10 minutes divided by five groups).

In one embodiment, durations of the time windows (109) may be formed based upon a detection of a triggering condition. For example, the duration of one or more of the time windows (109) may be bounded by a time period that is based on a detection of a pause or absence of messages for a specific amount of time.

In one embodiment, durations of the time windows (109) may be generated upon detection of certain amount of data messages (e.g., 5, 10, 20, message). In these examples, the triggering condition may be separately detected, received, and processed by the server (140).

The window vectors (110) may include window embeddings of a particular conversation to be processed. The window vectors (110) may be generated by the window model (124). The window model (124) may be a neural network model that may use transformer algorithms, attention algorithms, embedding algorithms, etc., to learn sentence vector associations from the conversation to be processed. In one embodiment, the window model (124) may be a pretrained bidirectional encoder representations from transformers (BERT) language model. Once trained, the window model (124) may detect synonymous sentence vectors and generate a representation of a distinct sentence vector in vector form. The window vectors (110) may capture the semantic meaning and syntactic qualities of the sentence vectors. The window vectors (110) with similar values and having shorter distances to each other (which may be measured by cosine similarity) have similar semantic meaning or other similar properties.

The count values (111) are features that may be appended to the window vectors (110). In one embodiment, one of the count values (111) identifies a count of the number of messages (104) and corresponding sentence vectors (107) that are represented by one of the window vectors (110). For example, the number of sentence vectors that are to be processed for one of the time windows (109) may be the integer value 10. The integer value 10 is the count value (i.e., one of the count values (111)) that may be concatenated or associated with the output of the window model to generate an updated window vector for the particular time window. For the time windows, the updated window vectors from the output of the window model (124) may be used as input to the conversation model (122) to generate the conversation vector.

The conversation vectors (112) may be representative of the likely context of the particular conversation to be processed. In one embodiment, one of the conversation vectors (112) represents one of the conversations (103). The conversation vectors (112) may be generated by the aggregation model (125) of the conversation model (122) and may be the output of the conversation model (122). For example, the aggregation model (125) may use a neural network model to learn updated window vector associations from the inputted window vectors to be processed. Once trained, the aggregation model (125) may detect synonymous window vector associations and generate a representation of a distinct window vector in vector form i.e., conversation vector. The conversation vectors (112) may capture the semantic meaning and syntactic qualities of the window vectors. The conversation vectors (112) with similar values and having shorter distances to each other (which may be measured by cosine similarity) have similar semantic meaning or other similar properties.

Sentiment vectors (113) may be representative of the likely emotional tone behind the particular conversation to be processed. The likely emotional tone may be positive, negative, or neutral. The sentiment vectors (113) may be generated by the sentiment model (126). For example, sentiment model (126) may use a neural network model to learn conversation vector associations from the output of the conversation model (122). Once trained, the sentiment model (126) may detect synonymous conversation vector associations and generate a representation of a distinct conversation vector in vector form i.e., sentiment vector. The sentiment vectors (113) may capture the semantic meaning and syntactic qualities of the window vectors. The sentiment vectors (113) with similar values and having shorter distances to each other (which may be measured by cosine similarity) have similar semantic meaning or other similar properties.

In one embodiment, the aggregation model (125) may form a layer of a language model that may be used to aggregate the generated window vectors (110). The aggregation model (125) may use a neural network model to learn association of aggregated conversation vectors from the output of the conversation model (122). Here, the aggregated conversation vectors may be used as an input to the sentiment model (126) to generate the sentiment vectors (113).

The model data (120) may store, without limitation, the word model (121), the sentence model (123), the window model (124), the conversation model (122), the aggregation model (125), and the sentiment model (126) to support the server application (141) when evaluating the conversation (143). The models in the model data (120) may be trained using the training data (130). Further, the models in the model data (120) may include attention layers to evaluate different aspects of the conversation (143) to generate the response (146).

The training data (130) may include training input data (131) to train the different language models in the model data (120). The models in the model data (120) may be trained using different portions of the training input data (131). Accordingly, each model in the model data (120) may generate a different portion of the training output data (132). In some embodiments, the training update data (133) may include data updates for the machine learning models being trained. The data updates, for example, may be based upon a comparison between the generated training output data (132) for a particular machine learning model and training performance metrics (not shown) that correspond to the training input data (131) that were input to the particular machine learning model. In another example, the data updates may be based upon the comparison between the generated training output data (132) and user-entered training performance metrics. Here, the training performance metrics may include one or more floating point values, integers, or binary values that may be representative of predicted output to be achieved by the particular machine learning model.

The server (140) may utilize distributed computing resources (e.g., one or more computing devices as described in FIG. 6A and FIG. 6B) that may operate in a cluster or other configuration to share resources, balance load, increase performance, provide fail-over support, redundancy, etc. The server (140) may include one or more interfaces to enable communications with the user devices A (152) and B (155) through N (158), and other networked devices via one or more networks (not shown). The networks may include public networks (such as the Internet), private networks, institutional networks, personal intranets, combinations thereof, etc. The networks may also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), combinations thereof, etc.

In one embodiment, the server (140) may include the server application (141). The server application (141) includes routines, program instructions, objects, data structures, etc., that are executed by one or more processors to perform particular tasks or implement particular data types. The server application (141), for example, may be configured to receive a request (142) for a classification, identification, or processing of the conversation (143). The conversation (143) may include, without limitation, word embeddings, sentence embeddings, paragraph embeddings, or a combination thereof. In this example, a conversation model (122) may receive and process the conversation (143) to generate a conversation vector (145). The conversation vector (145) may be represented in the response (146) that is communicated back to a user or used as an input to another language model, e.g., a sentiment model.

The training server (170) may include hardware and software components to train the machine learning models in the model data (120). The training application (171) may include a set of programs stored in a system memory and executing on at least one processor of the training server (170). In one embodiment, the training application (171) loads a particular machine learning model from the model data (120) to the training models (173), loads training inputs (172), and executes the training models (173) to generate training outputs (174). In one embodiment, the training application (171) may use training performance metrics to generate data updates and use the generated data updates when performing training updates (175). Upon satisfaction of the training performance metrics, for example, the training input data (131) of the training data (130) is updated. In one embodiment, backpropagation may be used to generate the training updates (175) from the training outputs (174) for the training models (173).

Figure 2:
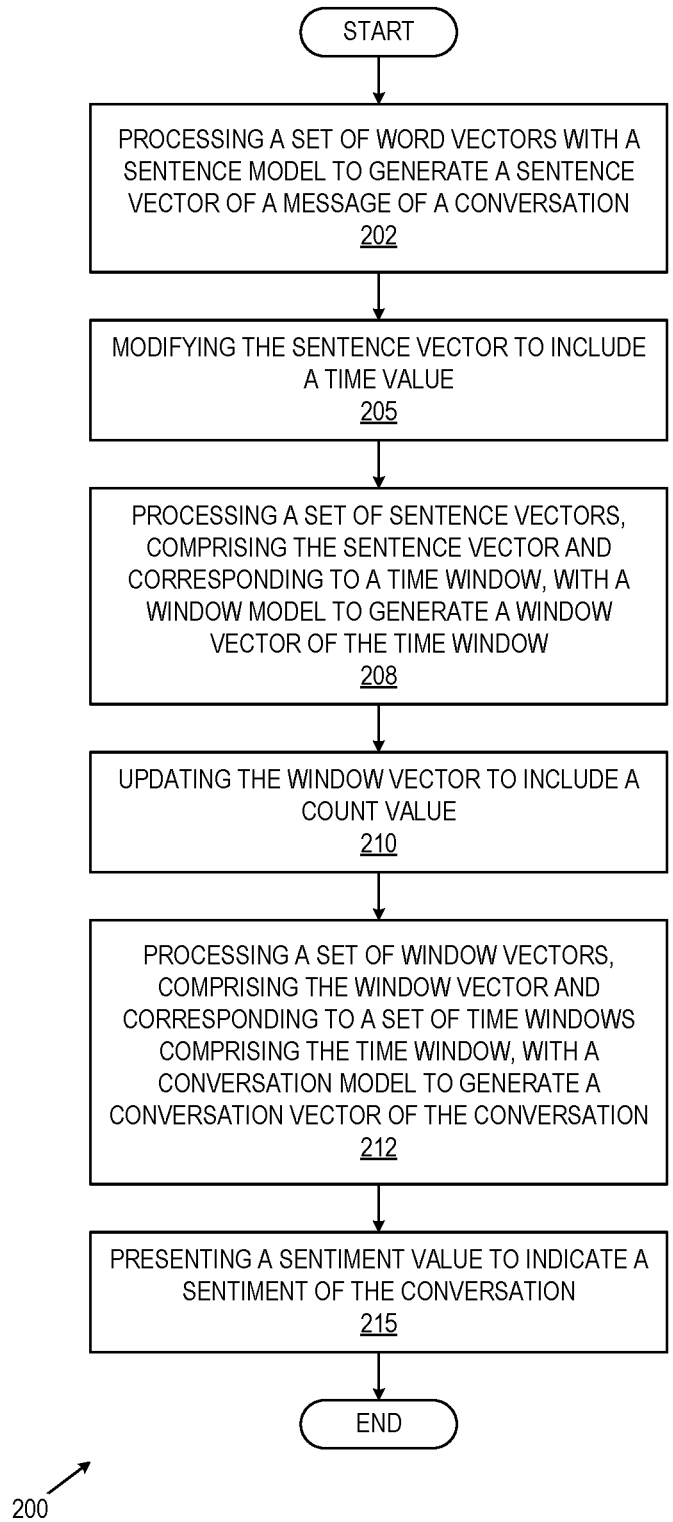
FIG. 2 is a flow diagram of an example procedure, in accordance with at least one embodiment.

Turning to FIG. 2, the process (200) generates a conversation vector representing a hierarchical understanding of a conversation generated with a hierarchical model. The process (200) may operate on a computing system as described in FIG. 6A and FIG. 6B. In one embodiment, the process (200) executes on the server (140) of FIG. 1. Further, certain operations may be ascribed to particular system elements shown in figures herein. However, alternative implementations may execute certain operations in conjunction with or wholly within a different element or component of the systems. Furthermore, to the extent that certain operations are described in a particular order, it is noted that some operations may be implemented in a different order to produce similar results.

At Step 202, a set of word vectors is processed with a sentence model to generate a sentence vector of a message of a conversation. In one embodiment, the server may use a word model to generate the set of word vectors that may be representative of the words to be processed by a sentence model. In this embodiment, the sentence model may include an attention layer that utilizes calculated weights of different word vectors to identify the relevant word vectors. In some embodiments, the identified relevant word vectors may be processed by the sentence model to generate the sentence vector of the message of the conversation.

At Step 205, the sentence vector is modified to include a time value. In one embodiment, the server may update a sentence vector by concatenating a time value to the sentence vector. In one embodiment, the concatenation may yield a single vector, which is representative of the modified sentence vector. The modified sentence vector may be used as an input to another layer of the language model such as, without limitation, a window model.

At Step 208, the set of sentence vectors, which includes the sentence vector and corresponds to a time window, is processed with the window model to generate a window vector of the time window. In a particular embodiment, the processing of the conversation includes subdividing the conversation into different time windows. Each time window may correspond to a particular window vector. Because each window vector may be derived from one or more sentence vectors, then each time window may also be associated with one or more sentence vectors.

In one embodiment, the server may use the window model to process the one or more sentence vectors in each time window to generate the window vector for the corresponding time window. The time window may be mapped to a window vector, which may be derived from one or more sentence vectors in the time window.

At Step 210, the window vector is updated to include a count value. In one embodiment, the server may concatenate the count value that is associated with a window vector to the window vector to yield a single vector, which is representative of an updated window vector. In another embodiment, the count value may be treated as a separate or additional feature that may be associated with the window vector. In this other embodiment, the count value and the window vector may be used as an input to another layer of the language model such as, without limitation, a conversation model.

At Step 212, a set of window vectors, which includes the window vector and corresponding to a set of time windows comprising the time window, is processed with the conversation model to generate the conversation vector of the conversation. As described above, a time window may correspond to a particular window vector. Because each window vector may be derived from one or more sentence vectors, each time window may also be associated with one or more sentence vectors. In one embodiment, the server may use the conversation model to process the window vectors from different time windows to generate the conversation vector of the conversation.

In one embodiment, the conversation vector is processed with a sentiment model to generate a sentiment value. The sentiment value may be one value of a sentiment vector that identifies the sentiment of the conversation represented by the conversation vector.

At Step 215, the sentiment value is presented that identifies a sentiment of the conversation. In one embodiment, the conversation includes remarks from a user of the system about the use of the system and the sentiment value is a prediction of the sentiment of the user toward continued use of the system. For example, the sentiment value may be a continuous scalar value from "0" to "1" with "0" indicating that the system predicts that the user will not likely user the system again and "1" indicating that the system predicts that the user will likely use the system again.

The sentiment value may be presented using a processor that generates the sentiment value from the conversation vector. In one embodiment, the sentiment value may be presented by selecting content to transmit to a user device. For example, when the sentiment value is below a sentiment threshold, the website may display a page requesting feedback from the user to improve the website. When the sentiment value is above the sentiment threshold, the website made display a page that does not request feedback from the user for improving the website.

Figure 3:
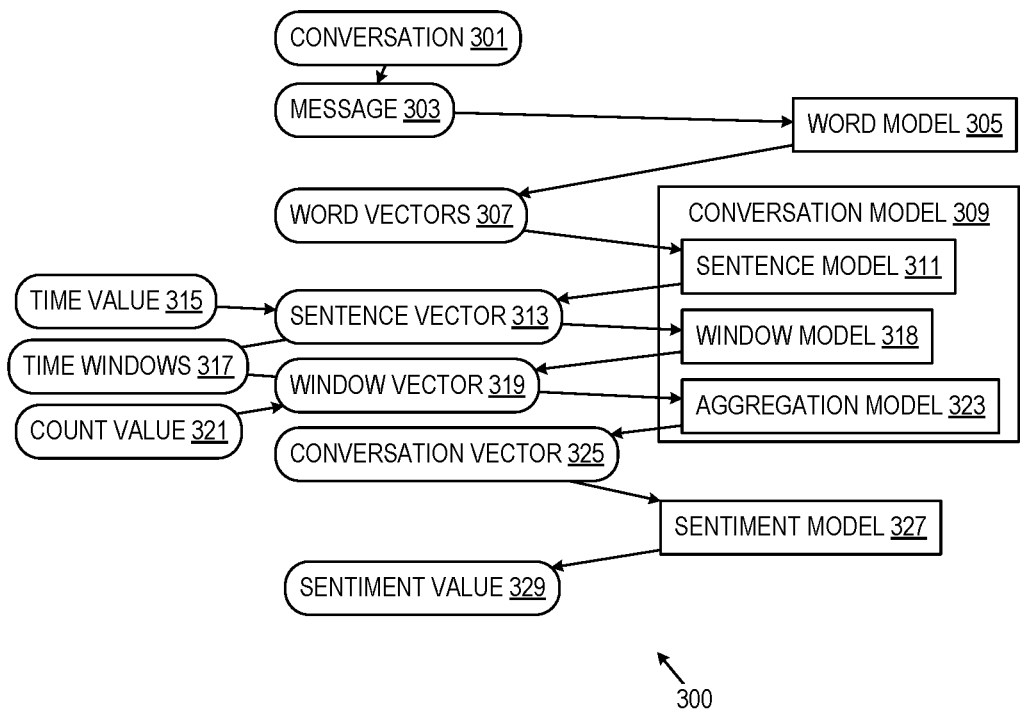
FIG. 3 is a flow diagram of an example procedure, in accordance with at least one embodiment.

Turning to FIG. 3, the sequence (300) shows a flow of data through a computing system to generate conversation vectors and sentiment vectors. The conversation vectors each represent a hierarchical understanding of a conversation and the sentiment vectors are generated from the conversation vectors.

In one embodiment, the conversation (301) represents exchanging of messages (including the message (303)) between user devices or between a user device and a chatbot in the server over a particular time period. The particular time period may include, for example, the length of time for the conversation (301).

In one embodiment the conversation (301) is split into sentences in which each sentence may represent text from a user device or a chatbot. One sentence corresponds to the message (303), which is input to the word model (305).

The word model (305) processes the message (303) to generate the word vectors (307). In one embodiment, the word model (305) is an embedding model that generates a word vector for each word or group of words from the sentence of the message (303). The word vectors (307) are input to the sentence model (311) of the conversation model (309).

The conversation model (309) is a machine learning model that generates the conversation vector (325) from the word vector (307). The conversation model (309) may use additional layers of models, which may include the sentence model (311), the window model (318), and the aggregation model (323).

The sentence model (311) receives the word vectors (307) (which represent the message (303)) and generates the sentence vector (313). In one embodiment, the sentence model (311) uses neural network algorithms that may utilize multiple transformer layers and multiple attention heads to generate the sentence vector (313) from the word vectors (307) input to the sentence model (311). After generating the sentence vector (313) from the word vectors (307), the time value (315) is combined with the sentence vector (313). In one embodiment, the time value is a value that identifies when the message (303) is received relative to the conversation (301) and may be appended to the sentence vector (313). For example, a value of "9.9" indicates that the message (303) includes a sentence from the conversation (301) that was received 9.9 seconds after the start of the conversation (301).

The sentence vector (313) is also grouped with other sentence vectors based on one of the time windows (317). A time window, of the time windows (317), identifies a period of time in the conversation (301) in which the sentence represented by the message (303) was received by the system. The sentence vector (313) along with other sentence vectors in the same time window are input to the window model (318).

The window model (318) processes multiple sentence vectors, including the sentence vector (313), to generate the window vector (319). In one embodiment, the window model (318) uses neural network algorithms that may utilize multiple transformer layers and multiple attention heads to generate the window vector (319) from the sentence vectors input to the window model (318). The window vector (319) is one of the window vectors generated for the conversation (301). In one embodiment, after the window vector (319) is generated by the window model (318), the count value (321) is combined with the window vector (319). The count value (321) identifies the number of sentence vectors that are represented by the window vector (319) and may be appended to the window vector (319). After being updated, the window vector (319), along with the other window vectors generated for the conversation (301), are input to the aggregation model (323).

The aggregation model (323) receives window vectors, the window vector (319), and processes the window vectors to generate the conversation vector (325). In one embodiment, the aggregation model (323) uses neural network algorithms that may utilize multiple transformer layers and multiple attention heads to generate the conversation vector (325) from the window vectors input to the aggregation model (323). The conversation vector (325) represents a hierarchical understanding of the conversation (301). After being output from the aggregation model (323), the conversation vector (325) is input to the sentiment model (327).

The sentiment model (327) receives the conversation vector (325) and generates the sentiment value (329). In one embodiment, the sentiment model may be a fully connected neural network that takes the conversation vector (325) as an input and outputs the sentiment value (329). In one embodiment, the sentiment value (329) may be a floating-point value in the range of "0" to "1". Lower sentiment values closer to zero may correlate with negative impressions or dissatisfaction expressed by the user in the conversation (301). Higher sentiment values, closer to one, may correlate with positive impressions and satisfaction as expressed by the user in the conversation (301).

In one embodiment, the sentiment value (329) may be part of a sentiment vector that includes multiple sentiment values. The multiple sentiment values may represent different sentiments, e.g., positive, neutral, negative, etc.

Figure 4:
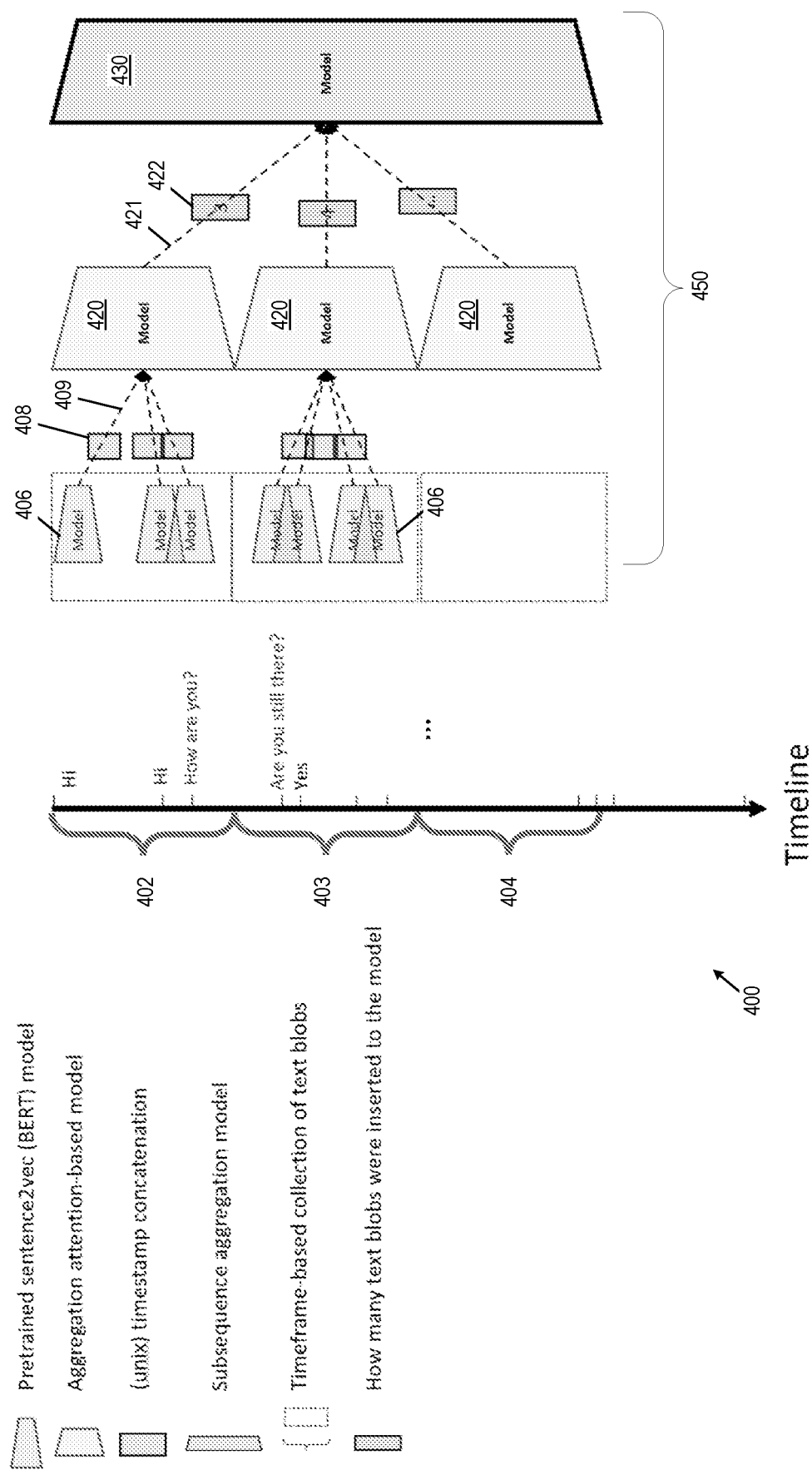
FIG. 4, FIG. 5A, FIG. 5B, and FIG. 5C show examples, in accordance with disclosed embodiments.

Tuning to FIG. 4, the diagram (400) illustrates an evaluation of the messages by a system. The messages evaluated are from a conversation from which a conversation vector is generated to represent a hierarchical understanding of the conversation.

The diagram (400) includes the time windows A (402), B (403), and C (404), and the sentence model (406) (used multiple times) that may generate sentence vectors (including the sentence vector (409)), which are mapped and concatenated to time value blocks (including the time value block (408)). The diagram (400) further shows the window model (420) used for each of the time windows A (402), B (403), and C (404). The window model (420) generates window vectors (including the window vector (421)), which are mapped to count value blocks (including the count value block (422)). Outputs of the window model (420) are then updated and processed by the aggregation model (430) to generate a conversation vector.

The time windows A (402), B (403), and C (404) (corresponding to the "timeframe-based collection of text blobs" identified in FIG. 4) may be the length of time or time periods of corresponding subdivided portions of a conversation. The time windows A (402), B (403), and C (404) may define groupings of the messages to be evaluated by the language models of the system (e.g., the sentence model (406), the window model (420), and the aggregation model (430), which form the conversation model (450)). In one embodiment, the time windows A (402), B (403), and C (404) may be preconfigured to have equal time periods. For example, a 9-minute conversation may be subdivided into three groups such that each time window may include a time period of 3 minutes.

In one embodiment, the time windows A (402), B (403), and C (404) may be subdivided to include different time periods based upon a detection of a triggering condition. For example, a time window such as the time window A (402) may be generated upon detection of a pause or absence of messages for a specific amount of time. The time window A (402) may be generated via a use of a preconfigured threshold that may be utilized as a reference to determine the pause in the conversation.

In one embodiment, the time window such as the time window A (402) may be generated upon detection of certain amount of data messages. A count threshold may be used that identifies a number of messages (also referred to as "text blobs" in FIG. 4) or a character threshold may be used that identifies a maximum number of text characters per time window.

The sentence model (406) may process word vectors generated from the messages (e.g., the topmost text blob "Hi") to generate the sentence vectors (e.g., the sentence vector (409)). In one embodiment, each of the sentence vectors may include a corresponding time value such as the time values identified by the time value blocks (e.g., the time value block (408)). For example, the sentence vector (409) may have a time value of "0" to indicate it is the first message of the conversation. Subsequent sentence vectors include subsequent time values after the initial time value. For example, the messages "How are you?" may have a time value of 3 indicating it occurred 3 seconds into the conversation.

The time windows A (402), B (403), and C (404) define the groupings of these sentence vectors. The time window A (402) includes sentence vectors for the text blobs "Hi" (corresponding to the sentence vector (409), "Hi", and "How are you?". The time window B (403) includes sentence vectors for four text blobs, including the text blobs "Are you still there?" and "Yes".

In one embodiment, the sentence vectors (including the sentence vector (409)) may be processed by the time value blocks (including the time value block (408)). In one embodiment, each of the time value blocks may be concatenated with corresponding sentence vectors to yield corresponding modified sentence vectors. The modified sentence vectors may be used as the inputs to the window model (420).

In one embodiment, a single time value block may be used for multiple sentence vectors. The single time value block may have an average of the time values for the sentence vectors of a time window.

In one embodiment, the count value blocks (including the count value block (422)) may identify the count values for the time windows A (402), B (403), and C (404). For example, the count value block (422) indicates three sentences (i.e., text blobs) are represented by the window vector for the time window (402). The subsequent time window includes four sentences, identified in a subsequent count value block.

Figure 5A:
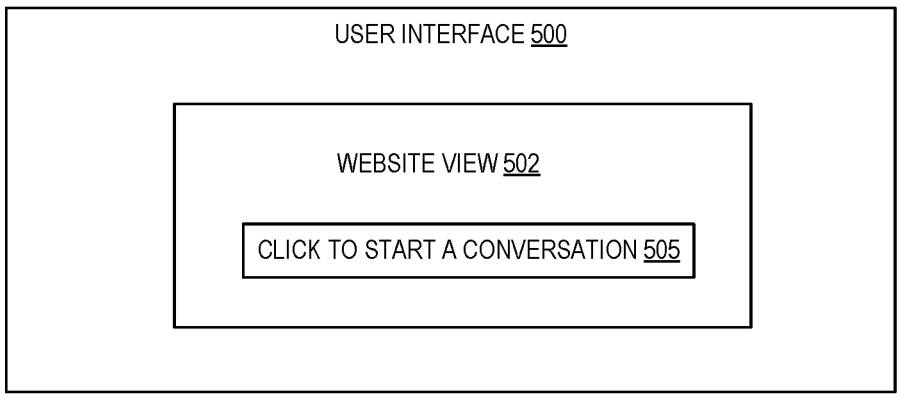
Figure 5B:
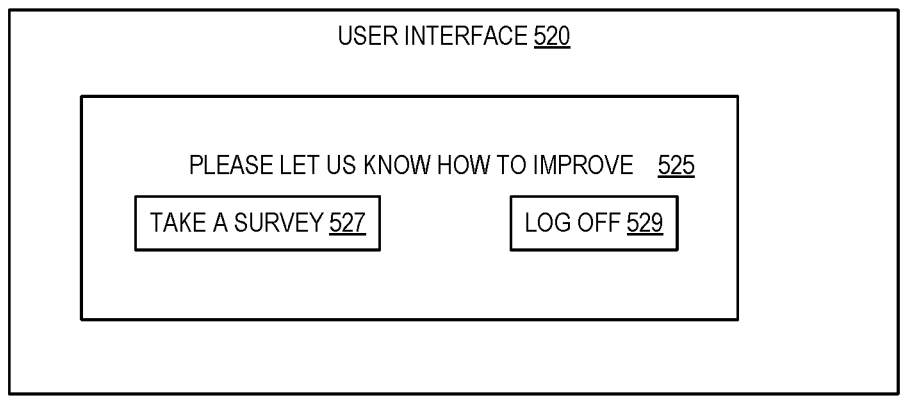
Figure 5C:
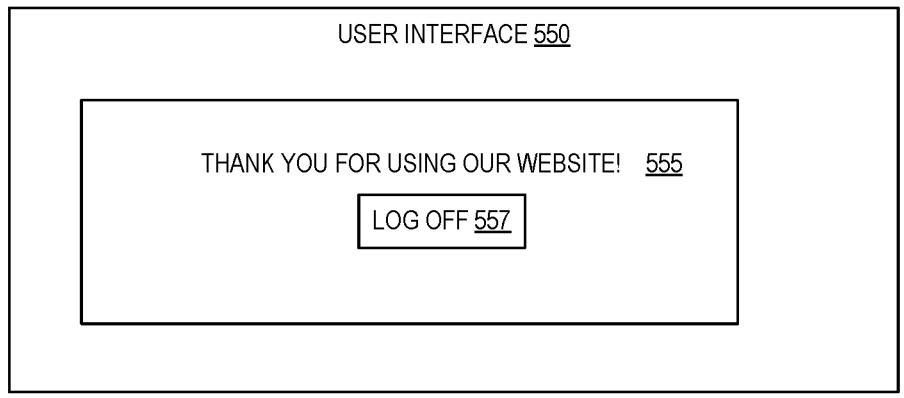

FIG. 5A through FIG. 5C show user interfaces of a user device. The user interfaces may be used to exchange messages and create conversations that are converted to conversation vectors from which sentiment vectors are generated.

Turning to FIG. 5A, the user interface (500) shows the website view (502) for a website. The user may start a conversation by selecting the interface element (505). Upon selection of the interface element (505), the user may be automatically connected to a chatbot.

Turning to FIG. 5B, the user interface (520) is updated from the user interface (500) (of FIG. 5A). After generating a conversation vector and corresponding sentiment vector, the system identifies that the sentiment vector is below a sentiment threshold or otherwise corresponds to a negative sentiment. In response, the user interface (520) includes the text "Please let us know how to improve" in the view (525) with the interface element (527) and the interface element (529). In one embodiment, selection of the interface element (527) brings up a survey that may be completed by the user to get feedback from the user to improve the website that led to the conversation that did not have a positive sentiment. In one embodiment, selection of the interface element (529) allows the user to log off from the system, which may be done without taking the survey.

Turning to FIG. 5C, the user interface (550) is updated from the user interface (500) (of FIG. 5A). After generating a conversation vector and corresponding sentiment vector, the system identifies that the sentiment vector is above a sentiment threshold or otherwise corresponds to a positive sentiment. In response, the user interface (550) includes the text "Thank you for using our website!" in the view (555) with the interface element (557) for logging off from the system. Since the sentiment was positive, the survey is not needed and the option to take the survey is not displayed.

Figure 6A:
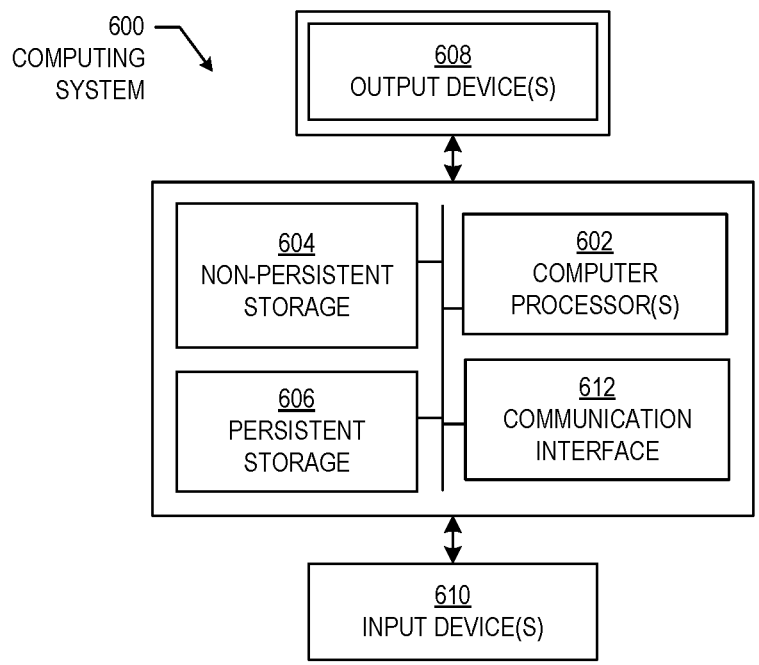
FIG. 6A and FIG. 6B show computing systems in accordance with disclosed embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (608). The inputs may include text input, audio input, video input, etc., which may be processed and transmitted by the computing system (600) in accordance with the disclosure. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output device(s) (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output device(s) (608) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 6B:
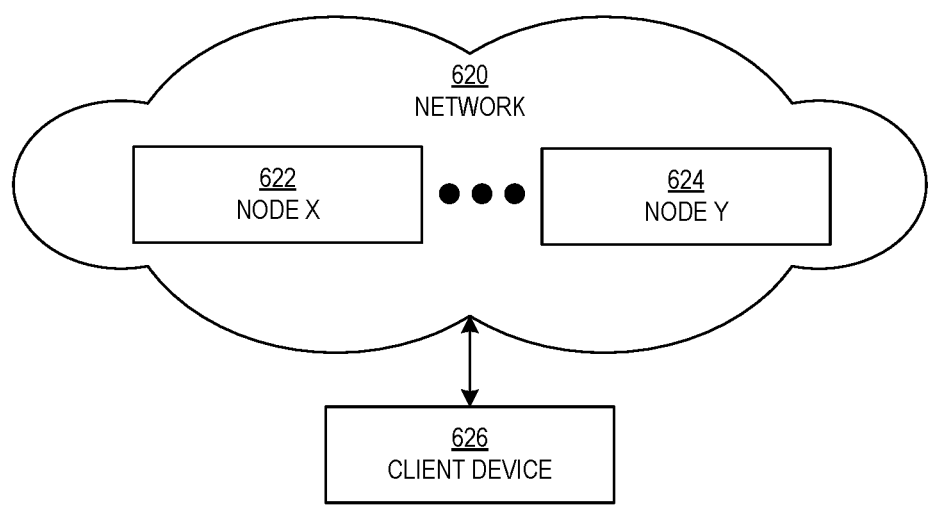

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented mask generation and background removal. The various elements, systems, components, and steps shown in the figures may be omitted, repeated, combined, and/or altered as shown from the figures. Accordingly, the scope of the present disclosure should not be considered limited to the specific arrangements shown in the figures.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
   processing, by a sentence model, a set of word vectors to generate a sentence vector of a message of a conversation, wherein the set of word vectors are for a set of words in the message, and wherein the sentence vector represents the message;
   modifying the sentence vector to include a time value identifying a time of the message in the conversation;
   processing, by a window model, a set of sentence vectors, comprising the sentence vector and corresponding to a time window, to generate a window vector of the time window;
   updating the window vector to include a count value identifying a count of the sentence vectors in the set of sentence vectors;
   processing, by a conversation model, a set of window vectors, comprising the window vector and corresponding to a set of time windows comprising the time window, to generate a conversation vector of the conversation; and
   presenting a sentiment value to indicate a sentiment of the conversation, wherein the sentiment value is presented using a processor that generates the sentiment value from the conversation vector,
   wherein the sentence model, the window model, and the conversation model comprise at least one neural network model.

2. The method of claim 1, further comprising:
   processing the conversation vector with a sentiment model to generate the sentiment value.

3. The method of claim 1, further comprising:
   processing the set of sentence vectors with the window model, wherein the window model comprises an attention layer.

4. The method of claim 1, further comprising:
processing the set of window vectors with the conversation model, wherein the conversation model comprises an attention layer.

5. The method of claim 1, further comprising:
training the window model to generate the window vector from the conversation.

6. The method of claim 1, further comprising:
training the conversation model to generate the conversation vector from the conversation.

7. The method of claim 1, further comprising:
training a sentiment model to generate the sentiment value from the conversation.

8. The method of claim 1, further comprising:
extracting a set of messages that correspond to the time window from the conversation.

9. The method of claim 1, further comprising:
processing the message with a word model to generate the set of word vectors.

10. The method of claim 1, further comprising:
determining the sentiment value is below a threshold; and
presenting a page requesting feedback on a website based on the sentiment value being below the threshold.

11. A system comprising:
a conversation model configured to generate a conversation vector from a conversation;
an application executing on one or more processors and configured for:
processing, by a sentence model, a set of word vectors to generate a sentence vector of a message of the conversation, wherein the set of word vectors are for a set of words in the message, and wherein the sentence vector represents the message;
modifying the sentence vector to include a time value identifying a time of the message in the conversation;
processing, by a window model, a set of sentence vectors, comprising the sentence vector and corresponding to a time window, to generate a window vector of the time window;
updating the window vector to include a count value identifying a count of the sentence vectors in the set of sentence vectors;
processing, by the conversation model, a set of window vectors, comprising the window vector and corresponding to a set of time windows comprising the time window, to generate the conversation vector of the conversation; and
presenting a sentiment value to indicate a sentiment of the conversation, wherein the sentiment value is presented using a processor that generates the sentiment value from the conversation vector,
wherein the sentence model, the window model, and the conversation model comprise at least one neural network model.

12. The system of claim 11, wherein the application is further configured for:
processing the conversation vector with a sentiment model to generate the sentiment value.

13. The system of claim 11, wherein the application is further configured for:
processing the set of word vectors with the sentence model, wherein the sentence model is a pretrained model.

14. The system of claim 11, wherein the application is further configured for:
processing the set of sentence vectors with the window model, wherein the window model comprises an attention layer.

15. The system of claim 11, wherein the application is further configured for:
processing the set of window vectors with the conversation model, wherein the conversation model comprises an attention layer.

16. The system of claim 11, wherein the application is further configured for:
training the window model to generate the window vector from the conversation.

17. The system of claim 11, wherein the application is further configured for:
training the conversation model to generate the conversation vector from the conversation.

18. The system of claim 11, wherein the application is further configured for:
training a sentiment model to generate the sentiment value from the conversation.

19. The system of claim 11, wherein the application is further configured for:
extracting a set of messages that correspond to the time window from the conversation.

20. A method comprising:
transmitting a request corresponding to a conversation, wherein the conversation is processed by:
processing a set of word vectors with a sentence model to generate a sentence vector of a message of the conversation, wherein the set of word vectors are for a set of words in the message, and wherein the sentence vector represents the message,
modifying the sentence vector to include a time value identifying a time of the message in the conversation,
processing a set of sentence vectors, comprising the sentence vector and corresponding to a time window, with a window model to generate a window vector of the time window,
updating the window vector to include a count value identifying a count of the sentence vectors in the set of sentence vectors, and
processing a set of window vectors, comprising the window vector and corresponding to a set of time windows comprising the time window, with a conversation model to generate a conversation vector of the conversation; and
receiving a response with a sentiment value generated from the conversation vector;
displaying the sentiment value to indicate a sentiment of the conversation;
determining the sentiment value is below a threshold; and
presenting a page requesting feedback on a website based on the sentiment value being below the threshold.

* * * * *